US012572696B2

(12) United States Patent
Rasori

(10) Patent No.: US 12,572,696 B2
(45) Date of Patent: Mar. 10, 2026

(54) ANONYMIZATION OF DATA RECORDS HAVING GEOGRAPHICAL LOCATIONS

(71) Applicant: Mortgage Capital Trading, Inc., San Diego, CA (US)

(72) Inventor: Philip Rasori, Healdsburg, CA (US)

(73) Assignee: Mortgage Capital Trading, Inc., San Diego, CA (US)

( * ) Notice: Subject to any disclaimer, the term of this patent is extended or adjusted under 35 U.S.C. 154(b) by 0 days.

(21) Appl. No.: 18/916,188

(22) Filed: Oct. 15, 2024

(65) Prior Publication Data

US 2026/0017411 A1 Jan. 15, 2026

Related U.S. Application Data

(63) Continuation of application No. 18/772,839, filed on Jul. 15, 2024, now abandoned.

(51) Int. Cl.
*G06F 21/62* (2013.01)
*G06F 16/909* (2019.01)

(52) U.S. Cl.
CPC ........ *G06F 21/6254* (2013.01); *G06F 16/909* (2019.01)

(58) Field of Classification Search
None
See application file for complete search history.

(56) References Cited

U.S. PATENT DOCUMENTS 4,998,279 A 3/1991 Weiss
5,717,989 A 2/1998 Tozzoli et al.

5,721,765 A 2/1998 Smith
5,995,947 A 11/1999 Fraser
6,088,451 A 7/2000 He et al.
6,088,686 A 7/2000 Walker et al.
6,421,453 B1 7/2002 Kanevsky et al.
6,509,847 B1 1/2003 Anderson
7,191,150 B1 3/2007 Shao et al.

(Continued)

OTHER PUBLICATIONS

Park et al., "Recommendation of investment portfolio for peer-to-peer lending with additional consideration of bidding Period." Annals of Operations Research 315.2 (2022):1083-1105, Oct. 14, 2021. Springer Science+Business Media, LLC.

(Continued)

*Primary Examiner* — Alexander Lagor
*Assistant Examiner* — Felicia Farrow
(74) *Attorney, Agent, or Firm* — Kaufman & Canoles, P.C.

(57) ABSTRACT

In one exemplary embodiment, a method is performed by a first network node configured to maintain a plurality of data records with each data record being specific to a certain geographical location and having personally identifiable information (PII) including that geographical location and an attribute related to that geographical location. The method includes sending, to a second network node operable to generate content that can rendered for display, an indication that includes an anonymized data record that represents a corresponding data record of the plurality of data records that is specific to a first geographical location with the PII of the corresponding data record being represented by anonymized information in the anonymized data record so that the second network node is enabled to generate content that represents the anonymized data record.

21 Claims, 11 Drawing Sheets

(56) References Cited

U.S. PATENT DOCUMENTS

| | | | |
|---|---|---|---|
| 7,433,842 B2 | 10/2008 | Toffey | |
| 7,698,214 B1 | 4/2010 | Lindgren | |
| 7,734,518 B2 | 6/2010 | Toffey | |
| 7,742,966 B2 | 6/2010 | Erlanger | |
| 7,756,777 B2 | 7/2010 | Toffey et al. | |
| 7,769,678 B2 | 8/2010 | Toffey | |
| 7,882,019 B2 | 2/2011 | Toffey | |
| 8,027,909 B2 | 9/2011 | Erlanger | |
| 8,185,466 B2 | 5/2012 | Martinez et al. | |
| 8,315,935 B2 | 11/2012 | Harrington | |
| 8,510,199 B1 | 8/2013 | Erlanger | |
| 8,521,644 B1 | 8/2013 | Hanson et al. | |
| 8,533,099 B2 | 9/2013 | Devers et al. | |
| 8,650,111 B2 | 2/2014 | Harrington | |
| 9,786,006 B2 | 10/2017 | Kirby et al. | |
| 10,049,405 B2 | 8/2018 | Toffey et al. | |
| 2001/0054155 A1 | 12/2001 | Hagan et al. | |
| 2002/0069160 A1 | 6/2002 | Olin | |
| 2002/0087894 A1 | 7/2002 | Foley et al. | |
| 2002/0091621 A1 | 7/2002 | Conklin et al. | |
| 2003/0105708 A1 | 6/2003 | Lee | |
| 2003/0115151 A1 | 6/2003 | Wheeler et al. | |
| 2003/0144950 A1 | 7/2003 | O'brien et al. | |
| 2003/0195859 A1 | 10/2003 | Lawrence | |
| 2004/0039685 A1 | 2/2004 | Hambrecht | |
| 2004/0128227 A1 | 7/2004 | Whipple et al. | |
| 2004/0128235 A1 | 7/2004 | Kemper et al. | |
| 2004/0153384 A1 | 8/2004 | Whipple et al. | |
| 2004/0172564 A1 | 9/2004 | Federova et al. | |
| 2005/0102226 A1 | 5/2005 | Oppenheimer | |
| 2005/0273406 A1 | 12/2005 | Lebda et al. | |
| 2006/0022059 A1 | 2/2006 | Juds | |
| 2006/0097036 A1 | 5/2006 | Koenigsman et al. | |
| 2006/0177094 A1 | 8/2006 | Smith | |
| 2007/0050618 A1 | 3/2007 | Roux et al. | |
| 2007/0142925 A1 | 6/2007 | Heinzman et al. | |
| 2007/0169171 A1 | 7/2007 | Kumar et al. | |
| 2007/0192237 A1 | 8/2007 | Duoos et al. | |
| 2007/0250439 A1 | 10/2007 | Crocker | |
| 2008/0126267 A1 | 5/2008 | Rosen et al. | |
| 2008/0249809 A1 | 10/2008 | Rosen et al. | |
| 2010/0205116 A1 | 8/2010 | Erlanger | |
| 2010/0262534 A1 | 10/2010 | Kaufman | |
| 2012/0078815 A1 | 3/2012 | Rossi | |
| 2012/0158573 A1 | 6/2012 | Crocker | |
| 2012/0239593 A1 | 9/2012 | von der Borch | |
| 2014/0129421 A1 | 5/2014 | Turnham | |
| 2014/0279683 A1 | 9/2014 | Campbell | |
| 2017/0128841 A1 | 5/2017 | Sloan | |
| 2021/0165910 A1* | 6/2021 | Huang | G06F 21/6254 |
| 2021/0232609 A1* | 7/2021 | Milton | G06F 16/2379 |
| 2023/0148326 A1* | 5/2023 | Papel | G06F 21/602 726/26 |
| 2024/0143838 A1* | 5/2024 | Ardhanari | G16H 30/40 |

OTHER PUBLICATIONS

*Weisner* v. *Google LLC*, 51 F.4th 1076 (2022).

"Mortgage Capital Trading Integrates its MCTlive! Secondary Software with Fannie Mae's Pricing & Execution—Whole Loan Application", Nov. 7. 2017, Neotrope, pp. 1-4 (Year: 2017).

Mortgage Capital Trading's Bulk Acquisition Manager Technology Achieves 100 Percent Investor Adoption, Oct. 17, 2017, Neotrope, Inc., pp. 1-3 (Year: 2017).

Financial Services Monitor Worldwide, "LendingQB and Mortgage Capital Trading Announce Enhanced Interface for Streamlined Secondary Marketing," May 12, 2016, SyndiGate Media, Inc., pp. 1-2 (Year: 2016).

"MCT Introduces Bid Auction Manager Secondary Tape Transfer Tech, " https://mct-trading_com/mct-introduces-bulkacquisition-manager-secondary-marketing-tape-transfer-technology/, Press Release, Jul. 18, 2017.

"MCT's Bid Auction Manager Technology Achieves 100 Percent Investor Adoption." https://mct-trading.com/baminvestor-adoption/, Press Release, Oct. 16, 2017.

"MCT Wins Progress in Lending Association's 2018 Innovation Aware for its New Bid Auction Manager (BAM) Whole Loan Trading Technology," https://mct-trading_com/bam-technology-innovation-award/. Apr. 17, 2018.

"LendingQB Integration with MCT Bid Auction Manager Improves Secondary Marketing Processes for Mutual Clients," https://mct-trading_com/lendingqb-integration/, Press Release, May 20, 2018.

"Eustis Mortgage Upgrades Loan Sales Process With BAM," https://mct-trading.comicase-study-timothy-ieyoub/, Blog, case Studies, Apr. 27, 2018.

"Bid Tape Management & Best Execution for Lenders," https://mct-trading.com/bid-auction-manager/, Jun. 26, 2018.

"MCT Officially Launches Trade Auction Manager to Enable Electronic TBA MBS Trading," https://www.send2press.com/wire/mct-officially-launches-trade-auction-manager-to-enable-electronic-tba-mbs-trading/, Press Release, May 16, 2019.

"Digitize and Democratize TBA Trading," https://mct-trading.com/trade-auction-managerl, Jun. 3, 2019.

"Case Study: Mountain West Financial Improves Efficiency & Improves Margins With Trade Auction Manager (TAM)," https://mct-trading_com/case-study-mountain-west-financial/. Blog. Case Studies, Featured, Nov. 8, 2019.

"MCT to Unveil MSRlive! Platform That Accurately, Easily and Quickly Values Servicing Portfolios," https://mct-trading.com/mct-unveil-msrlive-plafform-accurately-easily-quickly-values-servicing-portfolios/, Press Release, Oct. 24, 2018.

"Mortgage Servicing Rights Software—MSRlive!," https://mct-trading.com/solutionsimsr-valuation/msrlive/, Nov. 13, 2018.

"2021 HW Tech 100 Mortgage Award Announces MCT as Leader in Innovation," https://mct-trading.com/motwins-2021-hw-tech100-award/, Press Release, Mar. 29, 2021.

James Vickery et al., "TBA Trading and Liquidity in the Agency MBS Market," FRBNY Economic Policy Review, May 2013.

"Public Key Cryptography." Wikipedia, https://en.wikipedia.org/wiki/Public-key_cryptography. accessed Aug. 18, 2020.

Ex Parte Jeffrey Dean Lindsay, Appeal 2016-004861 for U.S. Appl. No. 12/489,416, filed Jun. 22, 2009, notification date Jan. 25, 2018.

Elizabeth Blosfield, "Password Stolen; Create a New One. What If Your Retina Scan or Fingerprint Is Stolen?," Insurance Journal, May 11, 2018, https://www.insurancejournal.com/news/national/2018/05/11/488962.html.

Aatif Sulleyman, "Samsung Galaxy S8 iris scanner hacked using contact lens," The Independent, May 24, 2017, https://www.independent.co.uk/life-style/gadgets-and-tech/news/samsung-galaxy-$8-iris-scanner-hack-contact-lenssecurity-smartphone-chaos-computer-club-a7752616.html.

"Hackers Spoof Samsung fris Scanners With a Photo and Contact Lens," Vocativ.com, May 23, 2017, https://www.vocativ.com/432355/hackers-spoof-samsung-iris-scanners-contact-lens/index.html.

"Can Biometrics be Fooled?," Telesign.com, 2012, https://www.telesign.com/blog/can-biometrics-be-fooled.

* cited by examiner

NETWORK NODE 300
(E.G. SERVER)

PROCESSING CIRCUITRY 301

MEMORY 303

COMMS CIRCUITRY
305

FIG. 3

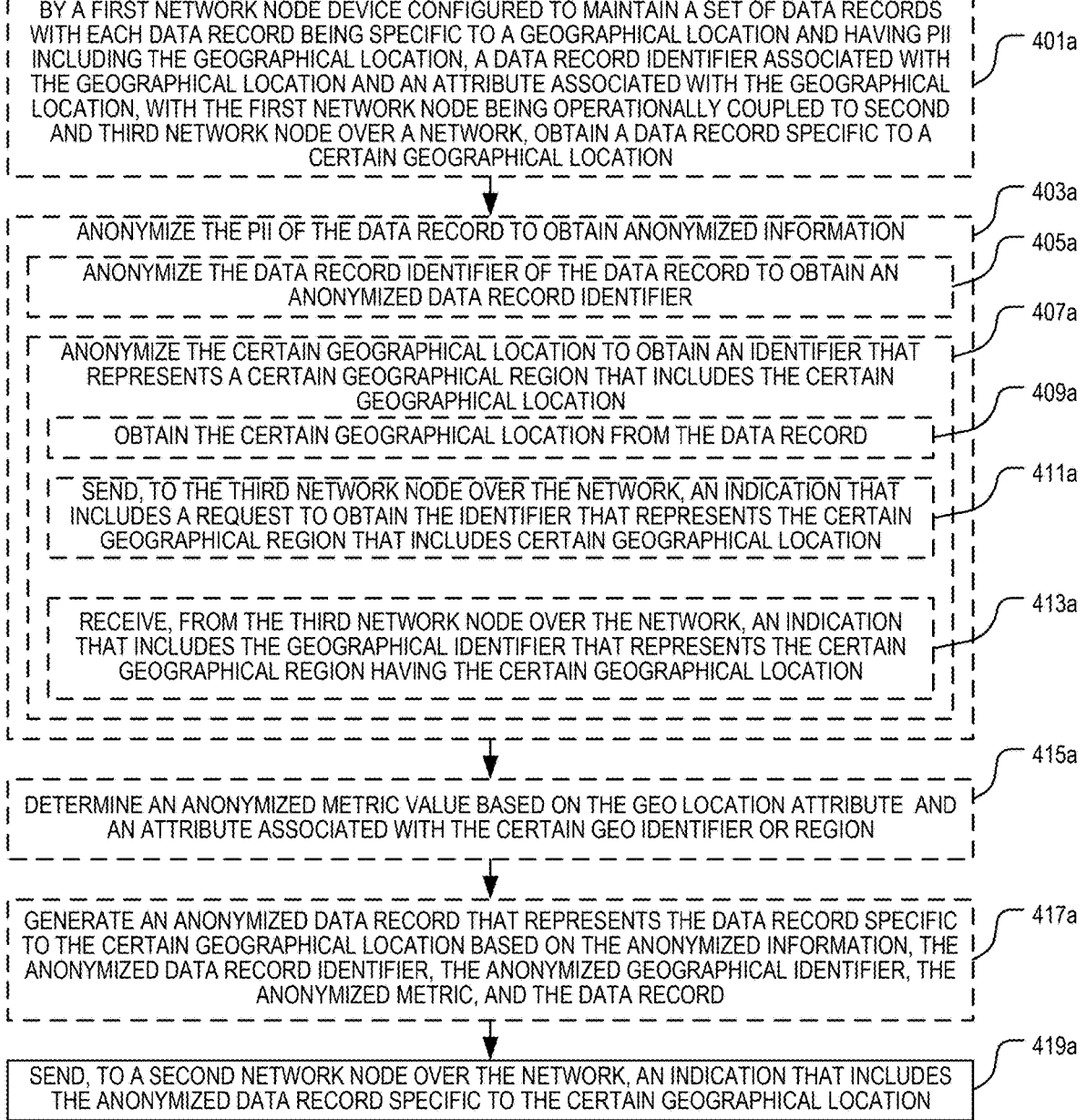

400a

BY A FIRST NETWORK NODE DEVICE CONFIGURED TO MAINTAIN A SET OF DATA RECORDS WITH EACH DATA RECORD BEING SPECIFIC TO A GEOGRAPHICAL LOCATION AND HAVING PII INCLUDING THE GEOGRAPHICAL LOCATION, A DATA RECORD IDENTIFIER ASSOCIATED WITH THE GEOGRAPHICAL LOCATION AND AN ATTRIBUTE ASSOCIATED WITH THE GEOGRAPHICAL LOCATION, WITH THE FIRST NETWORK NODE BEING OPERATIONALLY COUPLED TO SECOND AND THIRD NETWORK NODE OVER A NETWORK, OBTAIN A DATA RECORD SPECIFIC TO A CERTAIN GEOGRAPHICAL LOCATION — 401a

ANONYMIZE THE PII OF THE DATA RECORD TO OBTAIN ANONYMIZED INFORMATION — 403a

ANONYMIZE THE DATA RECORD IDENTIFIER OF THE DATA RECORD TO OBTAIN AN ANONYMIZED DATA RECORD IDENTIFIER — 405a

ANONYMIZE THE CERTAIN GEOGRAPHICAL LOCATION TO OBTAIN AN IDENTIFIER THAT REPRESENTS A CERTAIN GEOGRAPHICAL REGION THAT INCLUDES THE CERTAIN GEOGRAPHICAL LOCATION — 407a

OBTAIN THE CERTAIN GEOGRAPHICAL LOCATION FROM THE DATA RECORD — 409a

SEND, TO THE THIRD NETWORK NODE OVER THE NETWORK, AN INDICATION THAT INCLUDES A REQUEST TO OBTAIN THE IDENTIFIER THAT REPRESENTS THE CERTAIN GEOGRAPHICAL REGION THAT INCLUDES CERTAIN GEOGRAPHICAL LOCATION — 411a

RECEIVE, FROM THE THIRD NETWORK NODE OVER THE NETWORK, AN INDICATION THAT INCLUDES THE GEOGRAPHICAL IDENTIFIER THAT REPRESENTS THE CERTAIN GEOGRAPHICAL REGION HAVING THE CERTAIN GEOGRAPHICAL LOCATION — 413a

DETERMINE AN ANONYMIZED METRIC VALUE BASED ON THE GEO LOCATION ATTRIBUTE AND AN ATTRIBUTE ASSOCIATED WITH THE CERTAIN GEO IDENTIFIER OR REGION — 415a

GENERATE AN ANONYMIZED DATA RECORD THAT REPRESENTS THE DATA RECORD SPECIFIC TO THE CERTAIN GEOGRAPHICAL LOCATION BASED ON THE ANONYMIZED INFORMATION, THE ANONYMIZED DATA RECORD IDENTIFIER, THE ANONYMIZED GEOGRAPHICAL IDENTIFIER, THE ANONYMIZED METRIC, AND THE DATA RECORD — 417a

SEND, TO A SECOND NETWORK NODE OVER THE NETWORK, AN INDICATION THAT INCLUDES THE ANONYMIZED DATA RECORD SPECIFIC TO THE CERTAIN GEOGRAPHICAL LOCATION — 419a

FIG. 4A

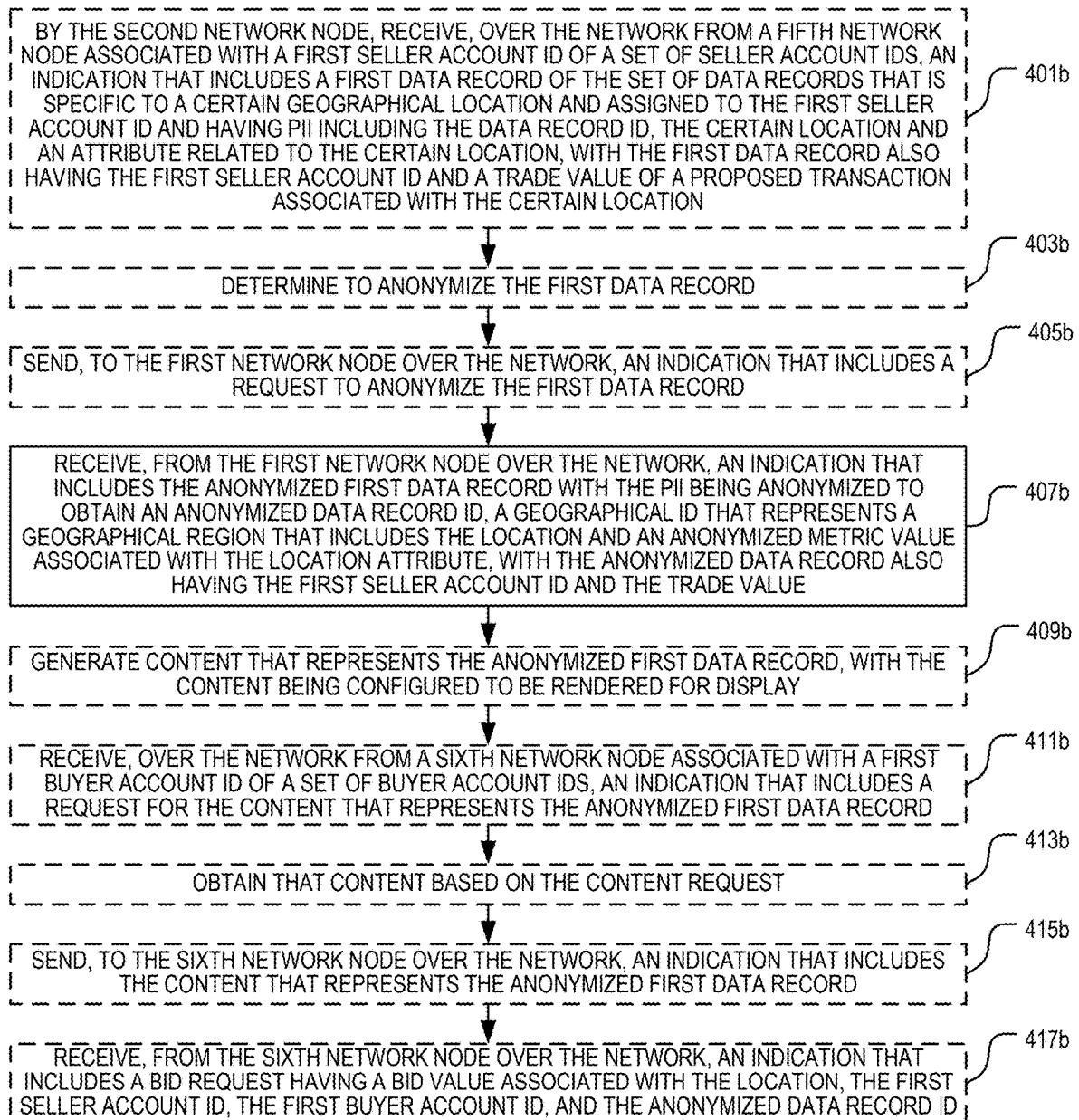

400b

BY THE SECOND NETWORK NODE, RECEIVE, OVER THE NETWORK FROM A FIFTH NETWORK NODE ASSOCIATED WITH A FIRST SELLER ACCOUNT ID OF A SET OF SELLER ACCOUNT IDS, AN INDICATION THAT INCLUDES A FIRST DATA RECORD OF THE SET OF DATA RECORDS THAT IS SPECIFIC TO A CERTAIN GEOGRAPHICAL LOCATION AND ASSIGNED TO THE FIRST SELLER ACCOUNT ID AND HAVING PII INCLUDING THE DATA RECORD ID, THE CERTAIN LOCATION AND AN ATTRIBUTE RELATED TO THE CERTAIN LOCATION, WITH THE FIRST DATA RECORD ALSO HAVING THE FIRST SELLER ACCOUNT ID AND A TRADE VALUE OF A PROPOSED TRANSACTION ASSOCIATED WITH THE CERTAIN LOCATION — 401b

DETERMINE TO ANONYMIZE THE FIRST DATA RECORD — 403b

SEND, TO THE FIRST NETWORK NODE OVER THE NETWORK, AN INDICATION THAT INCLUDES A REQUEST TO ANONYMIZE THE FIRST DATA RECORD — 405b

RECEIVE, FROM THE FIRST NETWORK NODE OVER THE NETWORK, AN INDICATION THAT INCLUDES THE ANONYMIZED FIRST DATA RECORD WITH THE PII BEING ANONYMIZED TO OBTAIN AN ANONYMIZED DATA RECORD ID, A GEOGRAPHICAL ID THAT REPRESENTS A GEOGRAPHICAL REGION THAT INCLUDES THE LOCATION AND AN ANONYMIZED METRIC VALUE ASSOCIATED WITH THE LOCATION ATTRIBUTE, WITH THE ANONYMIZED DATA RECORD ALSO HAVING THE FIRST SELLER ACCOUNT ID AND THE TRADE VALUE — 407b

GENERATE CONTENT THAT REPRESENTS THE ANONYMIZED FIRST DATA RECORD, WITH THE CONTENT BEING CONFIGURED TO BE RENDERED FOR DISPLAY — 409b

RECEIVE, OVER THE NETWORK FROM A SIXTH NETWORK NODE ASSOCIATED WITH A FIRST BUYER ACCOUNT ID OF A SET OF BUYER ACCOUNT IDS, AN INDICATION THAT INCLUDES A REQUEST FOR THE CONTENT THAT REPRESENTS THE ANONYMIZED FIRST DATA RECORD — 411b

OBTAIN THAT CONTENT BASED ON THE CONTENT REQUEST — 413b

SEND, TO THE SIXTH NETWORK NODE OVER THE NETWORK, AN INDICATION THAT INCLUDES THE CONTENT THAT REPRESENTS THE ANONYMIZED FIRST DATA RECORD — 415b

RECEIVE, FROM THE SIXTH NETWORK NODE OVER THE NETWORK, AN INDICATION THAT INCLUDES A BID REQUEST HAVING A BID VALUE ASSOCIATED WITH THE LOCATION, THE FIRST SELLER ACCOUNT ID, THE FIRST BUYER ACCOUNT ID, AND THE ANONYMIZED DATA RECORD ID — 417b

FIG. 4B

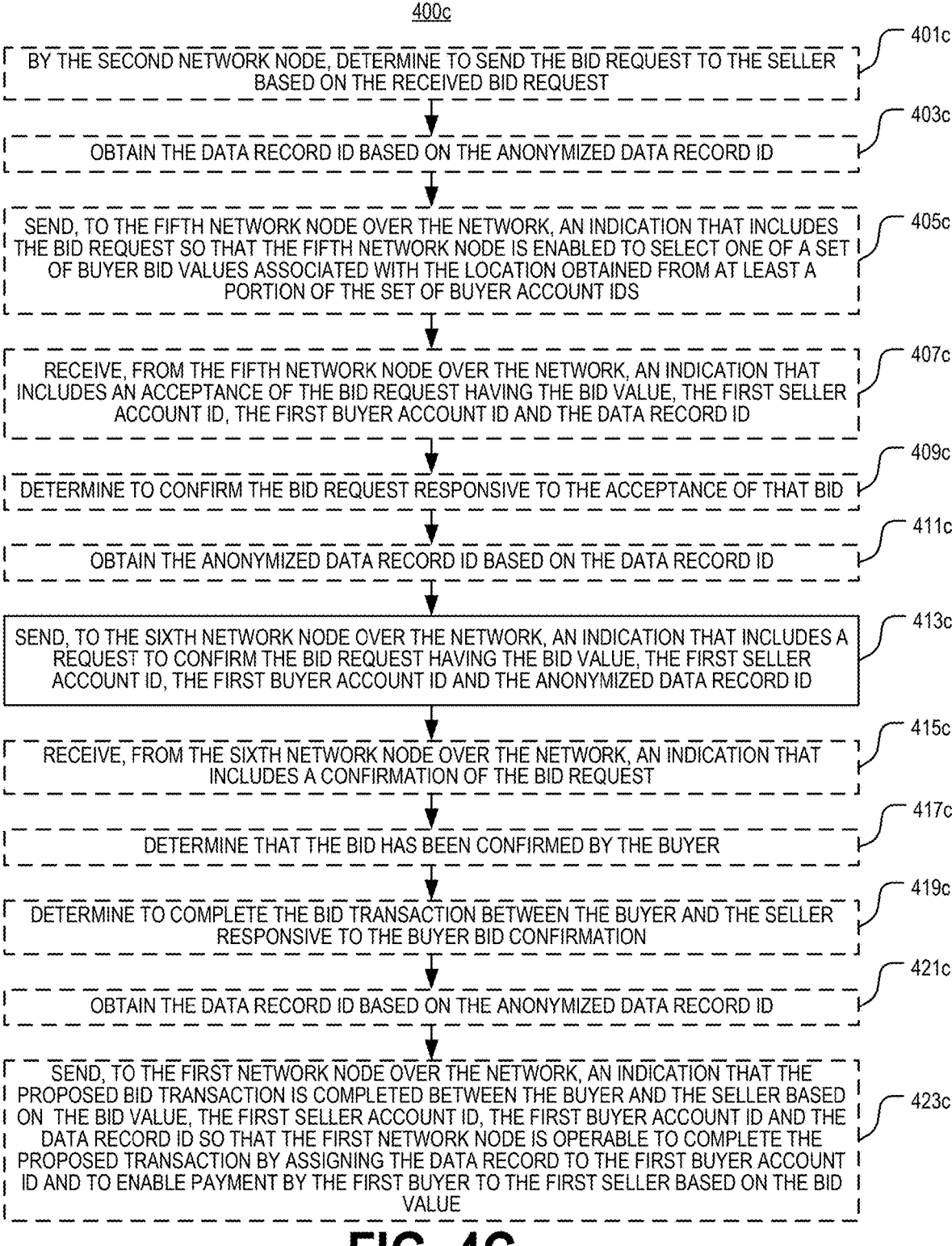

400c

401c — BY THE SECOND NETWORK NODE, DETERMINE TO SEND THE BID REQUEST TO THE SELLER BASED ON THE RECEIVED BID REQUEST

403c — OBTAIN THE DATA RECORD ID BASED ON THE ANONYMIZED DATA RECORD ID

405c — SEND, TO THE FIFTH NETWORK NODE OVER THE NETWORK, AN INDICATION THAT INCLUDES THE BID REQUEST SO THAT THE FIFTH NETWORK NODE IS ENABLED TO SELECT ONE OF A SET OF BUYER BID VALUES ASSOCIATED WITH THE LOCATION OBTAINED FROM AT LEAST A PORTION OF THE SET OF BUYER ACCOUNT IDS

407c — RECEIVE, FROM THE FIFTH NETWORK NODE OVER THE NETWORK, AN INDICATION THAT INCLUDES AN ACCEPTANCE OF THE BID REQUEST HAVING THE BID VALUE, THE FIRST SELLER ACCOUNT ID, THE FIRST BUYER ACCOUNT ID AND THE DATA RECORD ID

409c — DETERMINE TO CONFIRM THE BID REQUEST RESPONSIVE TO THE ACCEPTANCE OF THAT BID

411c — OBTAIN THE ANONYMIZED DATA RECORD ID BASED ON THE DATA RECORD ID

413c — SEND, TO THE SIXTH NETWORK NODE OVER THE NETWORK, AN INDICATION THAT INCLUDES A REQUEST TO CONFIRM THE BID REQUEST HAVING THE BID VALUE, THE FIRST SELLER ACCOUNT ID, THE FIRST BUYER ACCOUNT ID AND THE ANONYMIZED DATA RECORD ID

415c — RECEIVE, FROM THE SIXTH NETWORK NODE OVER THE NETWORK, AN INDICATION THAT INCLUDES A CONFIRMATION OF THE BID REQUEST

417c — DETERMINE THAT THE BID HAS BEEN CONFIRMED BY THE BUYER

419c — DETERMINE TO COMPLETE THE BID TRANSACTION BETWEEN THE BUYER AND THE SELLER RESPONSIVE TO THE BUYER BID CONFIRMATION

421c — OBTAIN THE DATA RECORD ID BASED ON THE ANONYMIZED DATA RECORD ID

423c — SEND, TO THE FIRST NETWORK NODE OVER THE NETWORK, AN INDICATION THAT THE PROPOSED BID TRANSACTION IS COMPLETED BETWEEN THE BUYER AND THE SELLER BASED ON THE BID VALUE, THE FIRST SELLER ACCOUNT ID, THE FIRST BUYER ACCOUNT ID AND THE DATA RECORD ID SO THAT THE FIRST NETWORK NODE IS OPERABLE TO COMPLETE THE PROPOSED TRANSACTION BY ASSIGNING THE DATA RECORD TO THE FIRST BUYER ACCOUNT ID AND TO ENABLE PAYMENT BY THE FIRST BUYER TO THE FIRST SELLER BASED ON THE BID VALUE

ANONYMIZATION OF DATA RECORDS HAVING GEOGRAPHICAL LOCATIONS

CROSS REFERENCE TO RELATED APPLICATIONS

This application is a continuation of U.S. patent application Ser. No. 18/772,839, filed Sep. 3, 2024, which is hereby incorporated by reference as if fully set forth herein.

BACKGROUND

In recent years, comprehensive data privacy laws, also known as data protection laws or consumer privacy laws, prohibiting the disclosure or misuse of information held on private individuals have been adopted in numerous countries throughout the world. For example, the European Union recently enacted the General Data Protection Regulation (GDPR), greatly restricting the collection, retention, and use of an individual's personal data. In the United States, California has enacted the California Consumer Privacy Act (CCPA), similarly restricting the use of personal data. As a direct consequence of the growing adoption rate of these data privacy laws by various jurisdictions, data privacy has become increasingly important especially given the potentially high penalties and fees leveraged against those companies and individuals who fail to comply with these regulations.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 3 illustrates another embodiment of a network node device in accordance with various aspects as described herein.

FIGS. 4A-4C illustrate embodiments of a method performed by a network node device of anonymizing data records having geographical locations in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

In this disclosure, systems and methods of anonymizing data records having geographical locations are provided. In one exemplary embodiment, a first network node device (e.g., data record server) is operable to maintain a plurality of data records (e.g., mortgage loans) with each data record being specific to a geographical location (e.g., residential address) and having PII including that geographical location and an attribute (e.g., home owner income) related to that geographical location. Further, the first network node device is operationally coupled over a network (e.g., LAN, WAN) to a second network node device (e.g., web server) operable to generate content (e.g., web page) that can be rendered for display. The first network node can send, to the second network node over the network, an indication that includes an anonymized data record that represents a corresponding data record of the plurality of data records that is specific to a certain geographical location. Further, the PII of the corresponding data record is represented by anonymized information in the anonymized data record so that the second network node is enabled to generate content that represents the anonymized data record. Further, the anonymized information includes a first geographical identifier or region of a plurality of geographical identifiers or regions (e.g., geocodes, zip codes) that includes the certain geographical location and an anonymized metric (e.g., Community Reinvestment Act incentive) related to the attribute of the certain geographical location obtained from the corresponding data record.

Figure 1A:
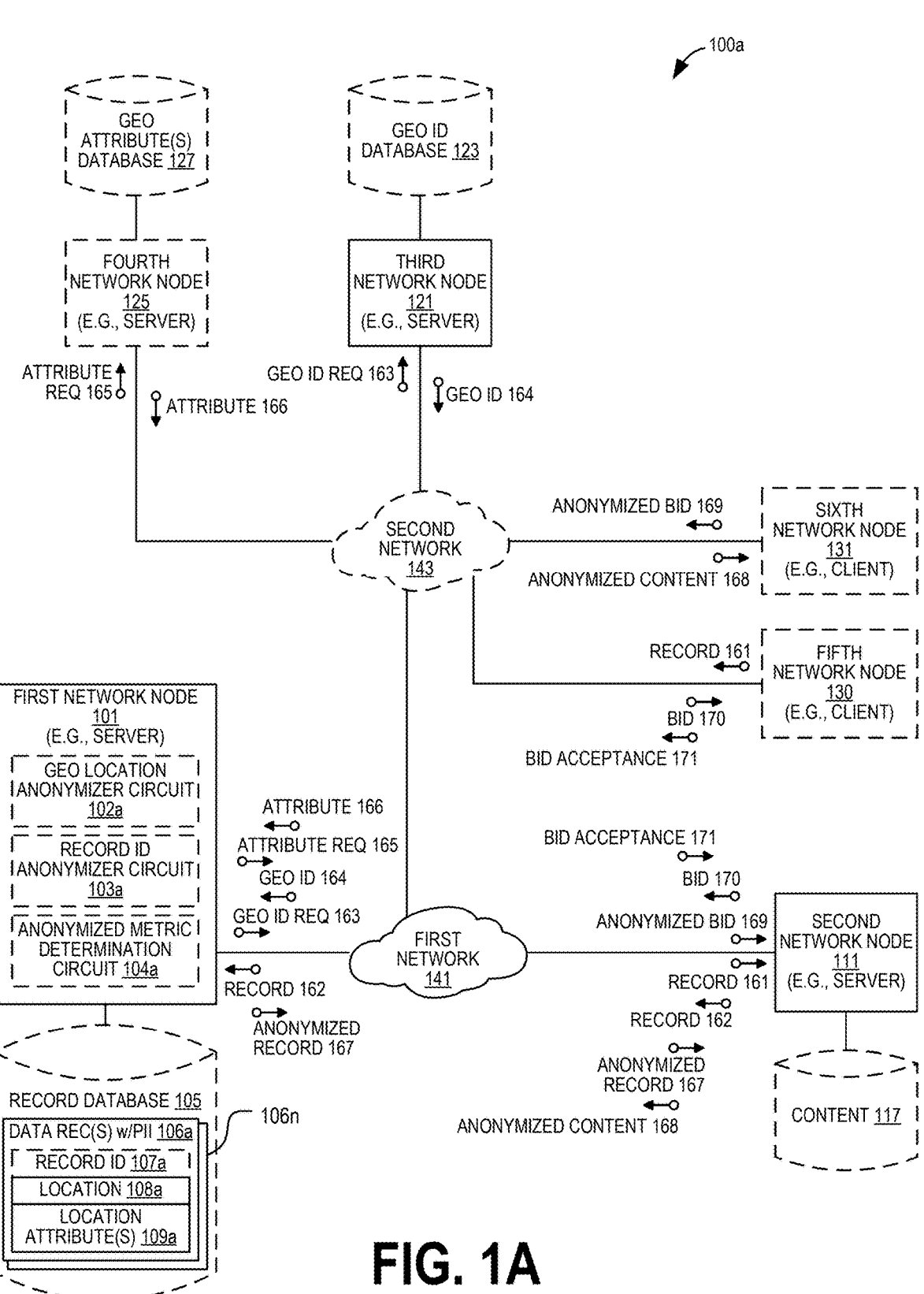
FIG. 1A illustrates one embodiment of a system operable to anonymize data records having geographical locations in accordance with various aspects as described herein.

FIG. 1A illustrates one embodiment of a system 100a operable to anonymize data records having geographical locations in accordance with various aspects as described herein. In FIG. 1A, the system 100a can include a first network node 101 (e.g., server) operable to maintain a database 105 having a plurality of data records 106a-n (e.g., transactions, mortgage loan instruments) with each data record 106a-n being specific to a geographical location 108a-n (e.g., property address, asset identifier) and having personally identifiable information (PII) including an identifier 107a-n (e.g., transaction reference, mortgage loan number) of that data record 106a-n, a geographical location 108a-n, and an attribute 109a-n (e.g., income level, median family income, median household income, median family income percentage, population, minority percentage, number of families, number of households, non-Hispanic white population, American Indian population, Asian/Hawaiian/ Pacific Islander population, black population, Hispanic population, two or more races population, owner-occupied units, percentage below poverty line, 1-to 4-family units, median house age, owner-occupied units, renter-occupied units, owner occupied 1-to 4-family units, inside principal city, vacant units) related to the geographical location 108a-n.

Furthermore, the attribute 109a-n related to the geographical location 108a-n can be associated with an environmental characteristic (e.g., climate, mineral resources, landforms, structures, hydrology), a human characteristic (e.g., language, religion, political affiliation), an income characteristic (e.g., family income), a demographic characteristic (e.g., minority status, number of family members), a housing characteristic (e.g., house age, inside principal city, vacancy status), a mortgage characteristic (e.g., mortgage loan amount, mortgage loan status, mortgage loan type, mortgage interest rate), or the like. PII can be any information used alone or with other PII to identify a specific individual or geographical location. PII can include a social security number, full name, email address, biometric record, driver license number, state-issued identification card number, financial information (e.g., financial account number, credit card number, debit card number, mortgage information), geographical location (e.g., home address, business address), face information (e.g., face image), vehicle plate or registration number, passport number, fingerprint information, or the like. The first network node 101 can be operationally coupled over a first network 141 such as a local area network (LAN) or a wide area network (WAN) to a second network node 111 (e.g., web server). The second network node 111 can be operable to generate and distribute content 117 (e.g., web pages) that can be rendered for display such as by a web browser. Further, the system 100a can include third, fourth, fifth and sixth network nodes 121, 125, 130, 131 coupled over a second network 143 such as a wide area network (e.g., Internet). The first and second networks 141, 143 may be different networks or all or a portion of the same network.

In FIG. 1A, the first network node 101 can obtain the data record 106a specific to the certain geographical location 108a. The first network node 101 can anonymize the PII of the data record 106a to obtain an anonymized data record. For instance, the first network node 101 can obtain the data record identifier 107a. A data record identifier anonymizer circuit 103a can be operable to anonymize the data record identifier to obtain an anonymized data record identifier. Further, the first network node 101 can obtain the certain geographical location 108a of the data record 106a. A geographical location anonymizer circuit 102a can be operable to anonymize the certain geographical location 108a to obtain a certain geographical identifier or region that represents a plurality of geographical locations, including the certain geographical location 108a. Additionally or alternatively, the first network node 101 can send, to the third network node 121 over the network(s) 141, 143, an indication 163 that includes a request to obtain the anonymized geographical identifier or region based on the certain geographical location 108a. The third network node 121 can receive the indication 163 and in response, can obtain the anonymized geographical identifier or region based on the certain geographical location 108a such as from a geographical identifier database 123 operable to associate one of a plurality of geographical locations with one of a plurality of geographical identifier or regions, with each geographical identifier or region having a plurality of geographical locations. The third network node 121 can then send, to the first network node 101 over the network(s) 141, 143, an indication 164 that includes the geographical identifier or region that corresponds to the certain geographical location 108a. The first network node 101 can receive the indication 164 that includes the anonymized geographical identifier or region.

In addition, the first network node 101 can anonymize the attribute 109a value related to the certain geographical location 108a to obtain an anonymized metric value. The anonymized metric can be associated with an environmental characteristic (e.g., climate, mineral resources, landforms, structures, hydrology), a human characteristic (e.g., language, religion, political system, economic system, population distribution), a census characteristic (e.g., income level indication, underserved/distressed region indication, median family income, median family income percentage, population, minority percentage, minority population, owner-occupied units, 1-to 4-family units), an income characteristic (e.g., median family income, median family income percentage, percentage below poverty line), a demographic characteristic (e.g., minority percentage, number of families, number of households, non-Hispanic white population, minority population, American Indian population, Asian/ Hawaiian/Pacific Islander population, Black population, Hispanic population, other races population), a housing characteristic (e.g., total housing units, 1- to 4-family units, median house age, owner-occupied units, owner occupied 1- to 4-family units, inside principal city, vacant units), a mortgage characteristic (e.g., median mortgage loan amount, mortgage loans in default percentage, mortgage loan type distribution, median mortgage interest rate), or the like. In one example, the anonymized metric can be a ratio of the attribute 109a value related to the certain geographical location 108a and an attribute value related to the corresponding geographical identifier or region. In another example, the anonymized metric can correspond to a certain financial metric that compares an attribute value related to the certain geographical location 108a to an attribute value related to the corresponding geographical identifier or region such as those financial metrics associated with the low income protection plan (LIPP), the very low income protection plan (VLIPP), the low-moderate income (LMI) incentive, Community Reinvestment Act (CRA) incentive, or the like.

Furthermore, the first network node 101 can be configured to include an anonymized metric determination circuit 104a operable to determine an anonymized metric based on the attribute 109a value related to the certain geographical location 108s and/or an attribute value related to the corresponding geographical identifier or region. In one example, the first network node 101 can send, to the fourth network node 125 over the network(s) 141, 143, an indication 165 that includes a request to obtain an attribute value related to a geographical identifier, region or location. The fourth network node 125 can receive the indication 165 and in response, obtain the attribute value related to the geographical identifier, region or location such as from a database 127 having a plurality of attributes related to geographical identifiers, regions or locations. The fourth network node 125 can then send, to the first network node 101 over the network(s) 141, 143, an indication 166 that includes the attribute value related to the geographical identifier, region, or location. The first network node 101 can receive the indication 166 to obtain the attribute value related to the geographical identifier, region, or location. The first network node 101 can then determine the metric value based on the attribute value related to the geographical identifier, region or location. In addition, the first network node 101 can generate the anonymized data record specific to the certain geographical location 108a based on the anonymized data record identifier, the anonymized geographical identifier or region, the anonymized metric, and the corresponding data record. The first network node 101 can then send, to the second network node 111 over the network(s) 141, 143, an indication 167 that includes the anonymized data record. The second network node 111 (e.g., web server) can receive the indication 167 and in response, can generate content (e.g., web content) configured to be rendered for display such as by a web browser based on the anonymized data record. For instance, the second network node 111 can receive an indication that includes a request for content that includes the anonymized data record. In response, the second network node 111 can obtain that content and can then send an indication 168 that includes that content.

In FIG. 1A, the third network node 121 (e.g., server) can be operable to anonymize a geographical location (e.g., property address, asset location) to obtain one of a plurality of geographical identifiers (e.g., geocodes, metropolitan/micropolitan statistical area codes, metropolitan division codes, state codes, county codes, zip codes, tract codes). Each geographical identifier can represent at least one of a plurality of geographical regions (e.g., metropolitan/micropolitan regions, state regions, county regions, tract regions, postal code regions). Further, each geographical region can represent a plurality of geographical locations or asset locations. In one definition, a geographical location can represent a physical address of an entity (e.g., property, asset). In another definition, a geographical location can represent a point, line, or area on the Earth's surface. In yet another definition, a geographical location can represent a latitude and a longitude. In the current embodiment, the third network node 121 can be configured to include a geographical identifier, region or location database 123 operable to associate one of a plurality of geographical locations with one of a plurality of geographical identifier or regions, with each geographical identifier or region having a plurality of geographical locations. Further, the database 123 can be configured to include the plurality of geographical identifiers, the plurality of geographical regions, the plurality of geographical locations, or the like. The third network node 121 can be operable to receive an indication 163 that includes a request to obtain a geographical identifier or region that corresponds to an included geographical location. The third network node 121 can receive the request indication 163 and in response, can obtain the geographical identifier or region based on the geographical location. The third network node 121 can query the geographical identifier database 123 based on the received geographical location to obtain a certain geographical identifier or region that includes the received geographical location.

In the current embodiment, the fourth network node 125 (e.g., server) can be operable to obtain an attribute value related to a geographical identifier, region or location such as from a database 127 having a plurality of attributes related to geographical identifiers, regions or locations. In one example, the fourth network node 125 can receive an indication 165 that includes a request for an attribute related to a certain geographical identifier, region or location. In response, the fourth network node 125 can query the database 127 based on the certain geographical identifier, region or location to obtain the corresponding attribute. The fourth network node 125 can then send an indication 166 that includes the attribute related to the certain geographical identifier, region or location. The fifth network node 130 can be a client device such as a smartphone, computer, laptop, tablet, or the like. The fifth network node 130 can be operable to render content for display (e.g., web browser application) such as on a display operatively coupled to the fifth network node 130. For instance, the fifth network node 130 can send, to the second network node 111 over the first or second network 141, 143, an indication that includes a request for content. The fifth network node 130 can receive, from the second network node 111 over the first or second network 141, 143, an indication that includes the content and in response, can render the content for display. In addition, the fifth network node 130 can send, to the second network node 111 over the network(s) 141, 143, an indication that includes a new data record for storage in the record database 105 or a modified data record to update a data record stored in the record data base 105. The sixth network node 131 can be a client device such as a smartphone, computer, laptop, tablet, or the like. The sixth network node 131 can be operable to render content for display (e.g., web browser application) such as on a display of the sixth network node 131. For instance, the sixth network node 131 can send, to the second network node 111 over the first or second network 141, 143, an indication that includes a request for content. The sixth network node 131 can receive, from the second network node 111 over the first or second network 141, 143, an indication 168 that includes the content and in response, can render the content for display.

Figure 1B:
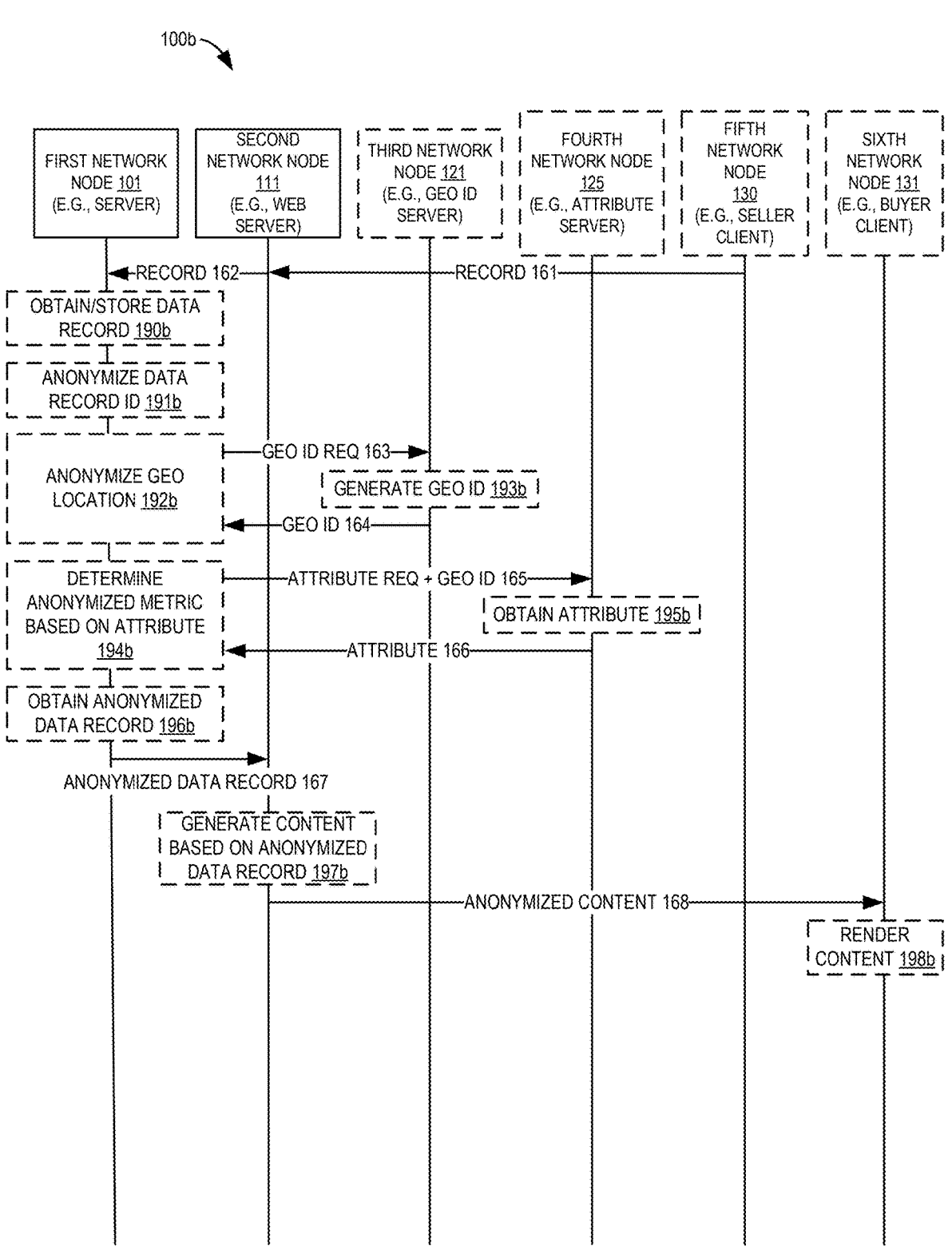
FIGS. 1B-1D are signal flow diagrams illustrating embodiments of the anonymization procedure of FIG. 1A.
Figure 1C:
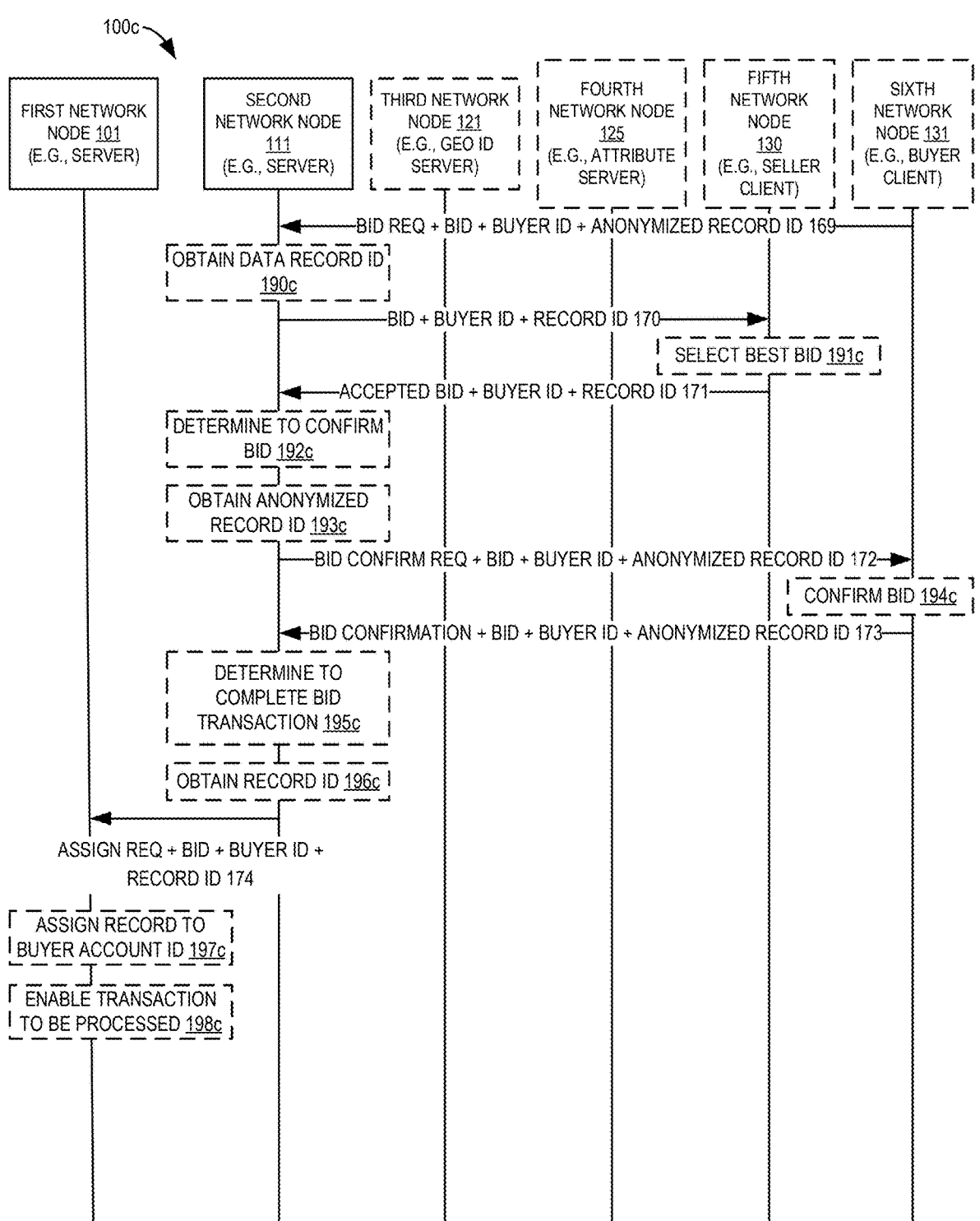
Figure 1D:
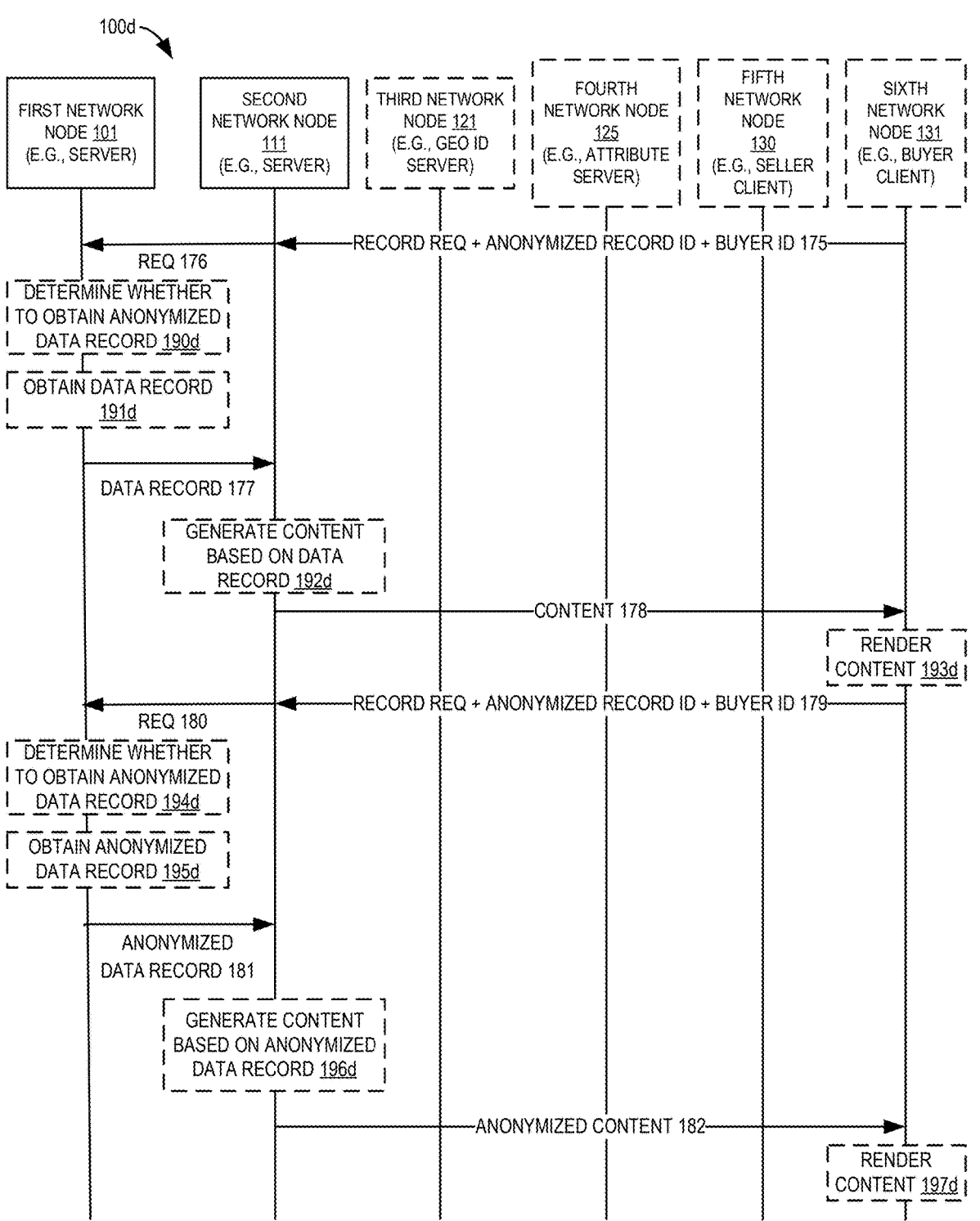

FIGS. 1B-1D are signal flow diagrams 100b-100d illustrating embodiments of the anonymization procedure of FIG. 1A. In FIG. 1B, the second network node 111 can receive, from the fifth network node 130 (e.g., seller client), an indication 161 that includes a data record having a data record identifier, a geographical location, an attribute associated with the geographical location, or the like. In one example, the second network node 111 can determine to forward the data record to the first network node 101. In response, the second network node 111 can obtain the data record based on the data record indication 161 and can then forward, to the first network node 101, an indication 162 that includes the data record. In another example, the second network node 111 can determine to request that the included data record be anonymized. In response, the second network node 111 can obtain the data record based on the data record indication 161 and can then send, to the first network node 101, an indication 162 that includes a request to anonymize the included data record. The first network node 101 can receive the data record indication 162 and in response, can obtain and store the data record in the data record database 105, as represented by block 190b. The data record 106a specific to the geographical location 108a can include the data record identifier 107a, the geographical location 108a, and an attribute 109a related to the geographical location 108a. The first network node 101 can anonymize the data record identifier 107a to obtain an anonymized data record identifier, as represented by block 191b. The first network node 101 can also anonymize the geographical location 108a to obtain the anonymized geographical identifier or region, as represented by block 192b. For instance, the first network node 101 can send, to the third network node 121 (e.g., geocode server) over the network(s) 141, 143, an indication 163 that includes a request to anonymize the included geographical location 108a. The third network node 121 can receive the indication 163 and in response, can generate an anonymized geographical identifier or region based on the geographical location 108a, as represented by block 193b. The third network node 121 can then send, to the first network node 101 over the network(s) 141, 143, an indication 164 that includes the anonymized geographical identifier or region.

Furthermore, the first network node 101 can determine an anonymized metric based on the attribute 109a related to the geographical location 108a and an attribute related to a corresponding geographical identifier or region, as represented by block 194b. For instance, the first network node 101 can send, to the fourth network node 125 (e.g., attribute server) over the network(s) 141, 143, an indication 165 that includes a request for the attribute associated with the corresponding geographical identifier or region, with the request including the corresponding geographical identifier, region or location. The fourth network node 125 can receive the indication 165 and in response, can obtain the attribute associated with the corresponding geographical identifier or region, as represented by block 195b. The fourth network node 125 can then send, to the first network node 101 over the network(s) 141, 143, an indication 166, that includes the attribute associated with the corresponding geographical identifier or region. The first network node 101 can receive the indication 166 to obtain the attribute associated with the corresponding geographical identifier or region. The first network node 101 can then determine the anonymized metric based on the received attribute associated with the corresponding geographical identifier or region. Further, the first network node 101 can generate an anonymized data record that represents the data record 106a based on the anonymized data record identifier, the anonymized geographical identifier and the anonymized metric, as represented by block 196b. The first network node 101 can update the stored data record to include the anonymized data record identifier, the anonymized geo location, the anonymized metric, the anonymized data record, the like, or any combination thereof. The first network node 101 can send, to the second network node 111 over the network 141, an indication 167 that includes the anonymized data record. The second network node 111 can receive the indication 167 to obtain the anonymized data record. Further, the second network node 111 can receive, from the sixth network node 131 (e.g., buyer client) over the network(s) 141, 143, an indication that includes a request for content having the anonymized data record. In response, the second network node 111 can generate the content based on the anonymized data record, as represented by block 197b, and can then send, to the sixth network node 131 over the network(s) 141, 143, an indication 168 that includes the content having the anonymized data record. The sixth network node 131 can receive the indication 168 to obtain the content having the anonymized data record and in response, can render the content for display, as represented by block 198b.

In FIG. 1C, the second network 111 can receive, from the sixth network node 131 (e.g., buyer client) over the network(s) 141, 143, an indication 169 that includes a request to enter a bid that includes the bid, a buyer identifier and the anonymized data record identifier. The second network node 111 can receive the bid request indication 169 and in response can obtain the data record identifier based on the received anonymized data record identifier, as represented by block 190c. The second network node 111 can then send, to the fifth node 130 (e.g., seller client) over the network(s) 141, 143, an indication 170 that includes the bid, the buyer identifier and the data record identifier. The fifth network node 130 can receive the bid indication 170 and in response, can select the best or preferred bid from those bids submitted by buyer clients, as represented by block 191c. The fifth network node 130 can then send an indication 171 that includes the accepted bid, the corresponding buyer identifier and the corresponding data record identifier. The second node 111 can receive the accepted bid indication 171 and can determine to confirm the accepted bid with the corresponding buyer client based on the corresponding buyer identifier, as represented by block 192c. At block 193c, the second network node 111 can obtain the anonymized data record identifier based on the received data record identifier. The second network node 111 can then send, to the sixth network node 131 (e.g., buyer client) over the network(s) 141, 143, an indication 172 that includes a bid confirmation request, the accepted bid, the buyer identifier, and the anonymized data record identifier. The sixth network node 131 can receive the bid confirmation request indication 172 and in response, can confirm the bid based on the bid confirmation request, as represented by block 194c. The sixth network node 131 can then send, to the second network node over the network(s) 141, 143, an indication 173 that includes a bid confirmation that confirms the bid by the buyer, the bid, the buyer identifier and the anonymized data record identifier. The second network node 111 can receive the bid confirmation indication 173 and in response, can determine that the buyer has confirmed the bid. In response to confirming the bid by the buyer, the second network node 111 can determine to complete the bid transaction, as represented by block 195c. At block 196c, the second network node 111 can obtain the record identifier of the data record that corresponds to the received anonymized record identifier and can then send, to the first network node 101 over the network(s) 141, 143, an indication 174 that includes a data record assignment request, the received bid, the received buyer identifier, and the data record identifier obtained from the received anonymized data record identifier. The first network node 101 can receive the data record assignment request indication 174 and in response, can determine to assign the data record associated with the data record identifier to the buyer account associated with the received buyer identifier based on the data record assignment request. The first network node 101 can then assign the data record associated with the data record identifier to the buyer account associated with the received buyer identifier, as represented by block 197c. Further, the first network node 101 can enable the transaction to be processed between the buyer and the seller based on the received buyer identifier, the seller identifier obtained from the data record and the bid, as represented by block 198c.

In another embodiment, the second network node 111 can send, to the first network node 101 over the network(s) 141, 143, an indication that includes a data record assignment request, the received bid, the received buyer identifier, and the received anonymized data record identifier. The first network node 101 can receive the data record assignment request indication and in response, can determine to assign the data record associated with the anonymized data record identifier to the buyer account associated with the received buyer identifier based on the data record assignment request. The first network node 101 can then assign the data record associated with the anonymized data record identifier to the buyer account associated with the received buyer identifier, as represented by block 197b.

In FIG. 1D, the sixth network node 131 can send, to the second network node 111 over the network(s) 141, 143, an indication 175 that includes a data record request, the anonymized data record identifier and the buyer identifier. The second network node 111 can receive the indication 175 and in response, can send, to the first network node 101 over the network(s) 141, 143, an indication 176 that includes the data record request, the anonymized data record identifier, and the buyer identifier. The first network node 101 can receive the indication 176 and in response, can determine whether to obtain the data record or the anonymized data record associated with the anonymized data record identifier based on the buyer or seller identifier, as represented by block 190d. In this example, the first network node 101 can determine that the data record associated with the anonymized data record identifier is assigned to the buyer having the buyer identifier and in response, can determine that the buyer having the buyer identifier can obtain the data record having the PII data. Alternatively, if the record is assigned to a buyer or seller having a different buyer or seller identifier than the requesting buyer or seller, then the anonymized data record associated with the anonymized data record identifier would be obtained for that requesting buyer or seller. At block 191d, the first network node 101 can obtain the data record having the PII data and can send, to the second network node 111 over the network(s) 141, 143, an indication 177 that includes the data record having the PII data. At block 192*d*, the second network node 111 can receive the indication 177 and in response, can generate content based on that data record. Further, the second network node 111 can send, to the sixth network node 131 over the network(s) 141, 143, an indication 178 that includes the content. The sixth network node 131 can receive the indication 178 and in response can render the content for display, which includes display of all or a portion of the data record having the PII data, as represented by block 193*d*.

In the current embodiment, the sixth network node 131 can send, to the second network node 111 over the network(s) 141, 143, an indication 179 that includes a data record request, the anonymized data record identifier, and the buyer identifier. The second network node 111 can receive the indication 179 and in response, can send, to the first network node 101 over the network(s) 141, 143, an indication 180 that includes the data record request, the anonymized data record identifier, and the buyer identifier. The first network node 101 can receive the indication 180 and in response, can determine whether to obtain the data record or the anonymized data record associated with the anonymized data record identifier based on the buyer identifier, as represented by block 194*d*. In this example, the first network node 101 can determine that the data record associated with the anonymized data record identifier is assigned to a buyer or seller having a different buyer or seller identifier and in response, can determine that the buyer having the certain buyer identifier can only obtain an anonymized version of the data record associated with the anonymized data record identifier. At block 195*d*, the first network node 101 can obtain the anonymized data record associated with the anonymized data record identifier and can send, to the second network node 111 over the network(s) 141, 143, an indication 181 that includes that anonymized data record. At block 196*d*, the second network node 111 can receive the indication 181 and in response, can generate content based on that anonymized data record. Further, the second network node 111 can send, to the sixth network node 131 over the network(s) 141, 143, an indication 182 that includes the anonymized content. The sixth network node 131 can receive the indication 182 and in response can render the anonymized content for display, which includes display of all or a portion of the anonymized data record, as represented by block 197*d*.

Figure 2A:
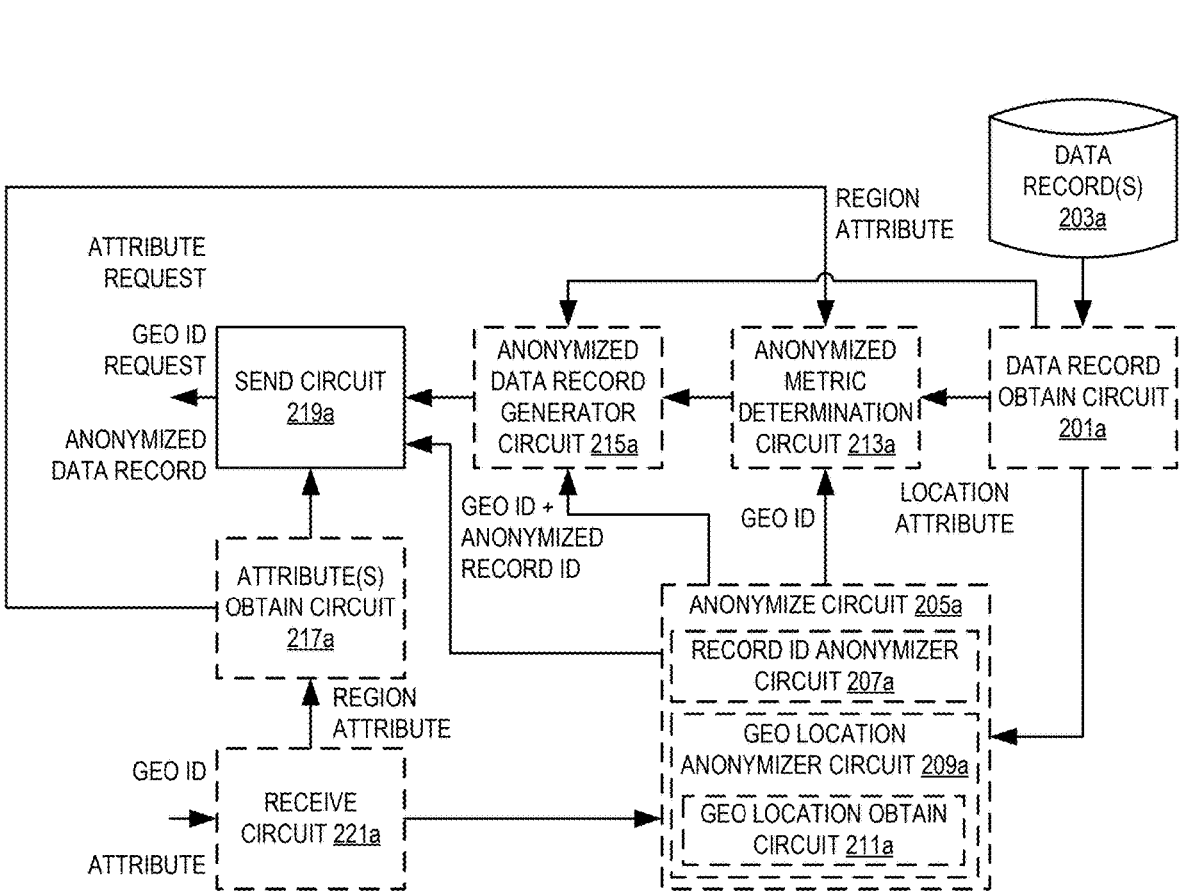
FIGS. 2A-2B illustrate embodiments of a network node device in accordance with various aspects as described herein.
Figure 2B:
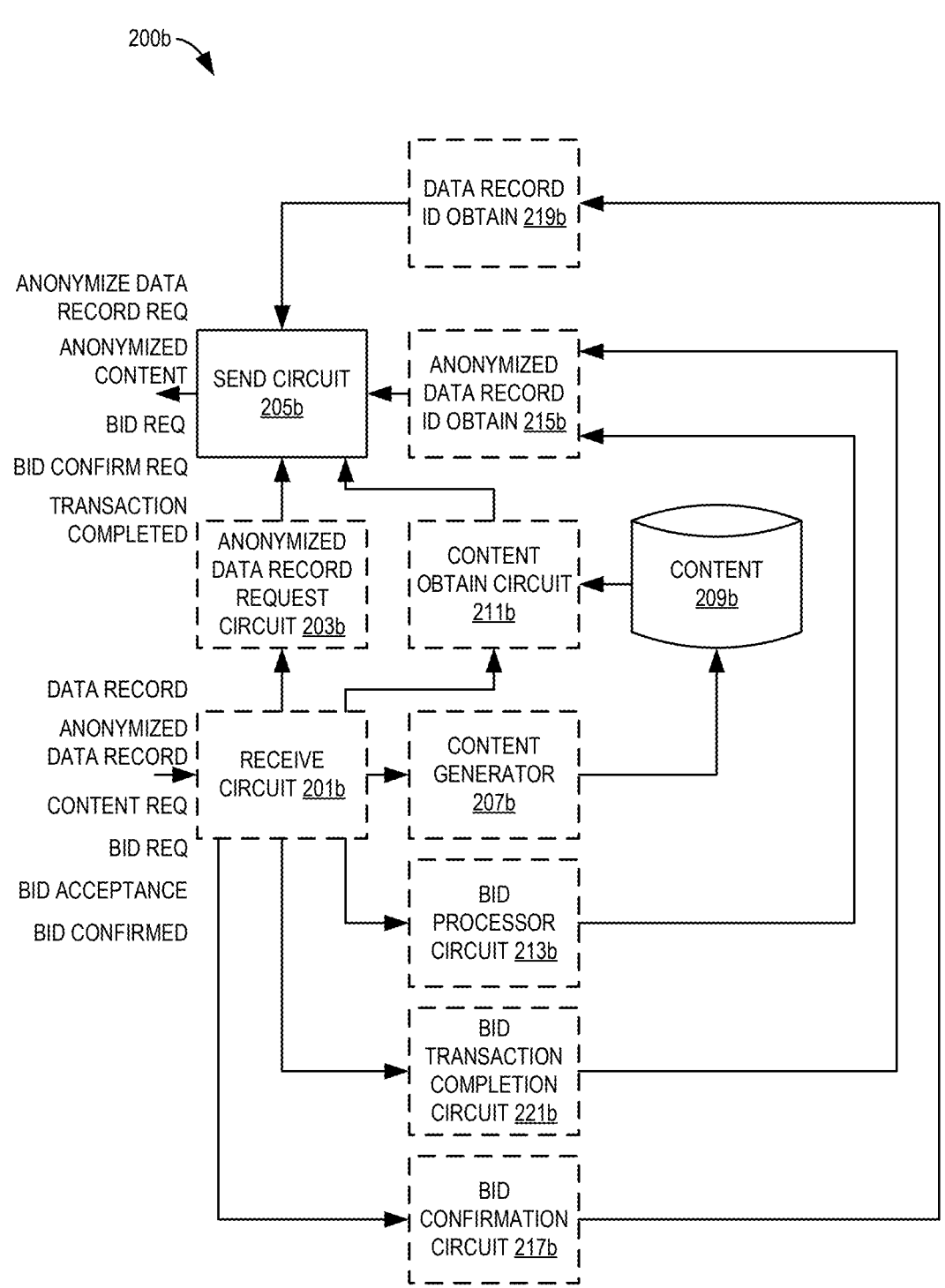

FIGS. 2A-2B illustrate embodiments of a network node device 200*a,b* in accordance with various aspects as described herein. In FIG. 2A, the device 200*a* implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: a data record obtain circuit 201*a* operable to obtain a data record specific to a certain geographical location from a data records database 203*a*; an anonymize circuit 205*a* operable to anonymize PII of a data record to obtain anonymized information specific to that location; a data record identifier anonymizer circuit 207*a* operable to anonymize a data record identifier of a data record to obtain an anonymized data record identifier; a geographical location anonymizer circuit 209*a* operable to anonymize the certain geographical location to one of a set of geographical identifiers that represents the certain geographical location, with each geographical identifier representing a certain geographical region with each region representing a set of geographical locations; a geographical location obtain circuit 211*a* operable to obtain the certain geographical location from the data record specific to the certain geographical location; an anonymized metric determination circuit 213*a* operable to determine a value of an anonymized metric that indicates a quality of an attribute specific to the certain geographical location; an anonymized data record generator circuit 215*a* operable to generate the anonymized data record based on the anonymized information and the corresponding data record specific to the certain geographical location; an attribute obtain circuit 217*a* operable to obtain an attributes specific to the certain geographical location; a send circuit 219*a* operable to send information; and/or a receive circuit 221*a* operable to receive information.

In FIG. 2B, the device 200*b* implements various functional means, units, or modules (e.g., via the processing circuitry 301 in FIG. 3, via the processing circuitry 501 in FIG. 5, via software code, or the like), or circuits. In one embodiment, these functional means, units, modules, or circuits (e.g., for implementing the method(s) described herein) may include for instance: a receive circuit 201*b* operable to receive information; an anonymized data record request circuit 203*b* operable to send, to the first network node over the network, an indication that includes a request to anonymize a data record; a send circuit 205*b* operable to send information; a content generator circuit 207*b* operable to generate content 209*b* that represents the anonymized first data record, with the content 209*b* being configured to be rendered for display; a content obtainer circuit 211*b* operable to obtain the content 209*b* that represents the anonymized first data record; a bid processor circuit 213*b* operable to process a bid request; an anonymized data record identifier obtain circuit 215*b* operable to obtain an anonymized data record identifier based on a data record identifier; a bid confirmation circuit 217*b* operable to confirm a bid by the buyer; a data record identifier obtain circuit 219*b* operable to obtain a data record identifier based on an anonymized data record identifier; and/or a bid transaction completion determination circuit 221*b* operable to complete a bid transaction between the buyer and the seller.

Figure 3:
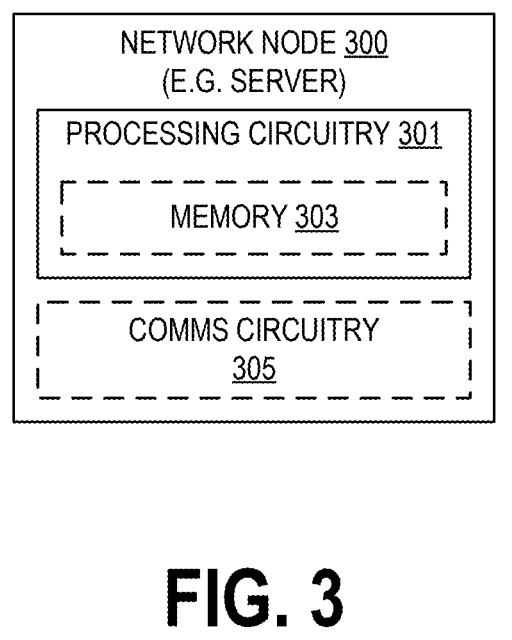

FIG. 3 illustrates another embodiment of a network node device in accordance with various aspects as described herein. In FIG. 3, the device 300 may include processing circuitry 301 that is operably coupled to one or more of the following: memory 303, network communications circuitry 305, or the like. The network communication circuitry 305 is configured to transmit or receive information to or from one or more other devices via any communication technology. The processing circuitry 301 is configured to perform processing described herein, such as by executing instructions stored in memory 303. The processing circuitry 301*a* in this regard may implement certain functional means, units, or modules.

FIG. 4A illustrates one embodiment of a method 400*a* performed by the first network node device 101, 200*a*, 300, 500 of anonymizing data records having geographical locations in accordance with various aspects as described herein. In FIG. 4A, the method 400*a* may start, for instance, at block 401*a* where it may include obtaining a data record specific to a certain geographical location. At block 403*a*, the method 400*a* may include anonymizing the PII of the data record to obtain anonymized information. As such, the method 400*a* may include anonymizing the data record identifier of the data record to obtain an anonymized data record identifier, as represented by block 405*a*. Further, the method 400*a* may include anonymizing the certain geographical location to obtain an identifier that represents a certain geographical region that includes the certain geographical location, as represented by block 407*a*. At block 409*a*, the method 400*a* may include obtaining the certain geographical location from the data record. At block 411*a*, the method 400*a* may include sending, to the third network node 121 over the network 141, 143, an indication that includes a request to obtain the geographical identifier based on the certain geographical location. At block 413*a*, the method 400*a* may receive, from the third network node 121 over the network 141, 143, an indication that includes the identifier that represents the certain geographical region having the certain geographical location. The method 400*a* may include determining a value of an anonymized metric based on an attribute associated with the geographical location obtained from the data record and an attribute associated with the certain geographical identifier or region, as represented by block 415*a*. At block 417*a*, the method 400*a* may include generating an anonymized data record that represents the data record specific to the certain geographical location based on the anonymized information, the anonymized data record identifier, the anonymized geographical identifier, the anonymized metric, and the data record. At block 419*a*, the method 400*a* includes sending, to a second network node over the network, an indication that includes the anonymized data record specific to the certain geographical location.

FIG. 4B illustrates one embodiment of a method 400*b* performed by the second network node device 111, 200*b*, 300, 500 of anonymizing data records having geographical locations in accordance with various aspects as described herein. In FIG. 4B, the method 400*b* may start, for instance, at block 401*b* where it may include receiving, over the network from a fifth network node associated with a first seller account identifier of a set of seller account identifiers, an indication that includes a first data record of a set of data records that is specific to a certain geographical location and assigned to the first seller account identifier and having PII including the data record identifier, the certain location and an attribute related to the certain location, with the data record also having the first seller account identifier and a trade value of a proposed transaction associated with the certain location. At block 403*b*, the method 400*b* may include determining to anonymize the data record. In response, the method 400*b* may include sending, to the first network node over the network, an indication that includes a request to anonymize the first data record, as represented by block 405*b*. At block 407*b*, the method 400*b* includes receiving, from the first network node over the network, an indication that includes the anonymized first data record with the PII being anonymized to obtain an anonymized data record identifier, a geographical identifier that represents a geographical region that includes the location and an anonymized metric value associated with the location attribute, with the anonymized data record also having the first seller account identifier and the trade value. At block 409*b*, the method 400*b* may include generating content that represents the anonymized first data record, with the content being configured to be rendered for display. At block 411*b*, the method 400*b* may include receiving, over the network from a sixth network node associated with a first buyer account identifier of a set of buyer account identifiers, an indication that includes a request for the content that represents the anonymized first data record. In response, the method 400*b* may include obtaining the content that represents the anonymized first data record based on the content request, as represented by block 413*b*. At block 415*b*, the method 400*b* may include sending, to the sixth network node over the network, an indication that includes the content that represents the anonymized first data record. In response, the method 400*b* may include receiving, from the sixth network node over the network, an indication that includes a bid request having a bid value associated with the location, the first seller account identifier, the first buyer account identifier, and the anonymized data record identifier, as represented by block 417*b*.

FIG. 4C illustrates another embodiment of a method 400*c* performed by the second network node device 111, 200*b*, 300, 500 of anonymizing data records having geographical locations in accordance with various aspects as described herein. In FIG. 4C, the method 400*c* may start, for instance, at block 401*c* where it may include determining to send the bid request to the seller based on the received bid request. At block 403*c*, the method may include obtaining the data record identifier based on the anonymized data record identifier. At block 405*c*, the method 400*c* may include sending, to the fifth network node over the network, an indication that includes the bid request so that the fifth network node is enabled to select one of a set of buyer bid values associated with the location obtained from at least a portion of the set of buyer account identifiers. In response, the method 400*c* can include receiving, from the fifth network node over the network, an indication that includes an acceptance of the bid request having the bid value, the first seller account identifier, the first buyer account identifier and the data record identifier, as represented by block 407*c*. At block 409*c*, the method 400*c* may include determining to confirm the bid request responsive to the acceptance of that bid. Further, the method 400*c* may include obtaining the anonymized data record identifier based on the data record identifier, as represented by block 411*c*. At block 413*c*, the method 400*c* includes sending, to the sixth network node over the network, an indication that includes a request to confirm the bid request having the bid value, the first seller account identifier, the first buyer account identifier and the anonymized data record identifier. In response, the method 400*c* may include receiving, from the sixth network node over the network, an indication that includes a confirmation of the bid request, as represented by block 415*c*. At block 417*c*, the method 400*c* may include determining that the bid has been confirmed by the buyer. In response, the method 400*c* may include determining to complete the transaction between the buyer and the seller, as represented by block 419*c*. At block 421*c*, the method 400*c* may include obtaining the data record identifier based on the anonymized data record identifier. At block 423*c*, the method 400*c* may include sending, to the first network node over the network, an indication that the proposed transaction is completed between the buyer and the seller based on the bid value, the first seller account identifier, the first buyer account identifier and the data record identifier so that the first network node is operable to complete the proposed transaction by assigning the data record to the first buyer account identifier and to enable payment by the first buyer to the first seller based on the bid value.

Figure 5:
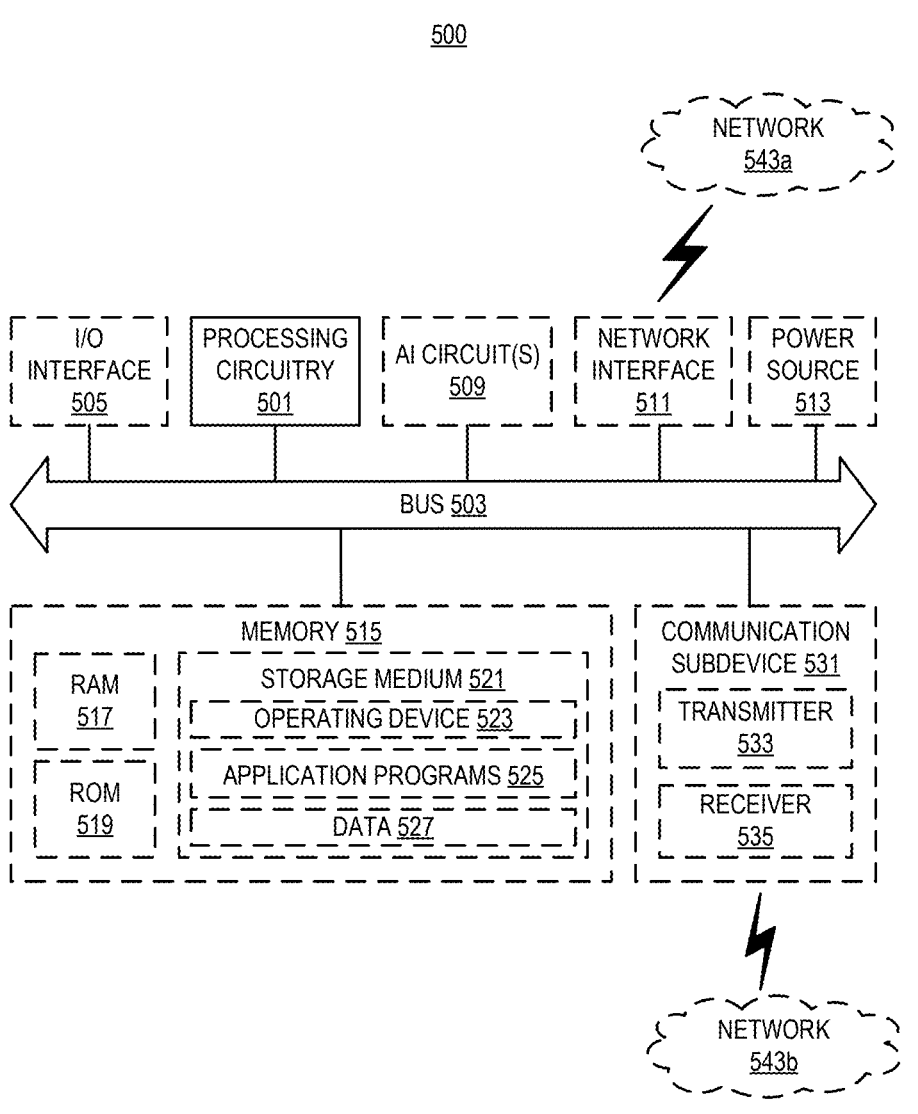
FIG. 5 illustrates another embodiment of a network node device in accordance with various aspects as described herein.

FIG. 5 illustrates another embodiment of a network node device 500 in accordance with various aspects as described herein. In FIG. 5, device 500 includes processing circuitry 501 that is operatively coupled over bus 503 to input/output interface 505, artificial intelligence circuitry 509 (e.g., neural network circuit, machine learning circuit), network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device 561 may use the same type of interface port as an input device. For example, a USB port or a Bluetooth port may be used to provide input to and output from the device 500. The output device may be a speaker, a sound card, a video card, a display, a monitor, a printer, an actuator, a transducer 575 (e.g., speaker, ultrasound emitter), an emitter, a smartcard, another output device, or any combination thereof. The device 500 may be configured to use an input device via input/output interface 505 to allow a user to capture information into the device 500.

In FIG. 5, storage medium 521 may include operating system 523, application program 525, data 527, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the artificial intelligence circuitry 509 may be configured to learn to perform tasks by considering examples. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a first network node configured to maintain a plurality of data records with each data record being specific to a geographical location and having PII including the geographical location and an attribute related to the geographical location. Further, the first network node is operationally coupled over a network to a second network node operable to generate content that can be rendered for display and to a third network node operable to anonymize a geographical location to obtain one of a plurality of geographical identifiers or regions. Each geographical identifier or region represents a plurality of geographical locations. The method includes sending, to the second network node over the network, an indication that includes an anonymized data record that represents a corresponding data record of the plurality of data records that is specific to a certain geographical location with the PII of the corresponding data record being represented by anonymized information in the anonymized data record so that the second network node is enabled to generate content that can be rendered for display based on the anonymized data record. In addition, the anonymized information includes a certain geographical identifier of a plurality of geographical identifiers that corresponds to a certain geographical region of a plurality of geographical regions that includes the certain geographical location and an anonymized metric value related to the attribute of the certain geographical location obtained from the corresponding data record.

In another exemplary embodiment, the method further includes obtaining the corresponding data record and anonymizing the PII of the corresponding data record.

In another exemplary embodiment, the method further includes anonymizing the certain geographical location to obtain one of the plurality of geographical identifiers or regions that represents the certain geographical location.

In another exemplary embodiment, the geographical location anonymizing step further includes sending, by the first network node, to the third network node over the network, an indication that includes a request to obtain the certain geographical identifier or region based on the included certain geographical location and receiving, by the first network node, from the third network node over the network, an indication that includes the certain geographical identifier or region.

In another exemplary embodiment, the method further includes determining a value of the anonymized metric based on the geographical location attribute of the corresponding data record and an attribute associated with the certain geographical identifier or region.

In another exemplary embodiment, the method further includes sending, by the first network node, to a fourth network node over the network, an indication that includes a request for an attribute related to the certain geographical identifier or region and receiving, by the first network node, from the fourth network node over the network, an indication that includes the attribute related to the certain geographical identifier or region.

In another exemplary embodiment, the method further includes anonymizing a data record identifier of the corresponding data record to obtain an anonymized data record identifier, with the anonymized data record having the anonymized data record identifier.

In another exemplary embodiment, the method further includes generating the anonymized data record specific to the certain geographical location based on the anonymized information, the anonymized metric, and the corresponding data record.

In another exemplary embodiment, the geographical location is a physical address of a property.

In another exemplary embodiment, the first and second network nodes are the same network node.

In one exemplary embodiment, a first network node device is configured to maintain a plurality of data records with each data record being specific to a geographical location and having PII including the geographical location and an attribute related to the geographical location. Further, the first network node is operationally coupled over a network to a second network node operable to generate content that can be rendered for display and to a third network node operable to anonymize a geographical loca- tion to obtain one of a plurality of geographical identifiers or regions. Each geographical identifier represents one of a plurality of geographical regions with each geographical region representing a plurality of geographical locations. The first network node includes a processor and a memory with the memory containing instructions executable by the processor whereby the processor is configured to send, to the second network node over the network, an indication that includes an anonymized data record that represents a cor- responding data record of the plurality of data records that is specific to a certain geographical location with the PII of the corresponding data record being represented by anony- mized information in the anonymized data record so that the second network node is enabled to generate content that can be rendered for display based on the anonymized data record. In addition, the anonymized information includes a certain geographical identifier of a plurality of geographical identifiers that corresponds to a certain geographical region of a plurality of geographical regions that includes the certain geographical location and an anonymized metric related to the attribute of the certain geographical location obtained from the corresponding data record.

In one exemplary embodiment, a system includes a first network node configured to maintain a plurality of data records with each data record being specific to a geographi- cal location and having PII including the geographical location and an attribute related to the geographical location. The system further includes a second network node opera- tionally coupled to the first network node over a network and operable to generate content that can be rendered for display. The first network node is operationally coupled to a third network node operable to anonymize a geographical loca- tion to obtain one of a plurality of geographical identifiers. Further, each geographical identifier represents one of a plurality of geographical regions with each geographical region representing a plurality of geographical locations. The first network node is operable to send, to the second network node over the network, an indication that includes an anonymized data record that represents a corresponding data record of the plurality of data records that is specific to a certain geographical location, with the PII of the corre- sponding data record being represented by anonymized information in the anonymized data record. Further, the anonymized information includes a certain geographical identifier of a plurality of geographical identifiers that cor- responds to a certain geographical region of a plurality of geographical regions that includes the certain geographical location and an anonymized metric related to the attribute of the certain geographical location obtained from the corre- sponding data record. In addition, the second network node is operable to generate content that can be rendered for display based on the anonymized data record.

The previous detailed description is merely illustrative in nature and is not intended to limit the present disclosure, or the application and uses of the present disclosure. Further- more, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized pro- cessors and field programmable gate arrays (FPGAs) and unique stored program instructions (including both software and firmware) that control the one or more processors to implement, in conjunction with certain non-processor cir- cuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the func- tions are implemented as custom logic circuits. Of course, a combination of the two approaches may be used. Further, it is expected that one of ordinary skill, notwithstanding pos- sibly significant effort and many design choices motivated by, for example, available time, current technology, and economic considerations, when guided by the concepts and principles disclosed herein will be readily capable of gen- erating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly asso- ciated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a first network node device operable to maintain a plurality of data records, wherein each data record is specific to a certain geographical location and has personally identifiable information including the certain geographical location and an attribute related to the certain geographical location, the first network node device being operationally coupled over a network to a second network node device operable to generate content that can be rendered for display, sending, to the second network node device over the network, an indication that includes an anonymized data record that represents a corresponding data record of the plurality of data records that is specific to a first geographical location, wherein the personally identifiable information of the corresponding data record is represented by anonymized information in the anonymized data record, wherein the anonymized data record includes:

a first geographical identifier of a plurality of geographical identifiers that corresponds to a first geographical region of a plurality of geographical regions, each region having a plurality of geographical locations and the first geographical region including the first geographical location; and an anonymized metric value determined based on a comparison between a value of an attribute related to the first geographical location obtained from the corresponding data record and an aggregated value of the same attribute related to the first geographical region, wherein the aggregated value is obtained by aggregating corresponding attribute values from a plurality of data records associated with geographical locations included in the first geographical region; and wherein the second network node device is enabled to generate web-compatible content that represents the anonymized data record, with the content being configured to be rendered for display by a web browser.

2. The method of claim 1, further comprising:

obtaining the corresponding data record; and anonymizing the personally identifiable information of the corresponding data record to obtain the anonymized information.

3. The method of claim 1, further comprising:

anonymizing the first geographical location to obtain the first geographical identifier that represents the first geographical region having the first geographical location.

4. The method of claim 3, wherein the step of first geographical location anonymizing includes:

sending, by the first network node device, to a third network node device over the network, an indication that includes a request to obtain the first geographical identifier that represents the first geographical region having the first geographical location based on the first geographical location included with the request indication, with the third network node device being operable to anonymize a geographical location to obtain one of the plurality of geographical identifiers that represents one of the plurality of regions having that geographical location; and receiving, by the first network node device, from the third network node device over the network, an indication that includes the first geographical identifier that represents the first geographical region having the first geographical location.

5. The method of claim 1, further comprising:

obtaining the value of the attribute related to the first geographical location based on the corresponding data record;

obtaining the aggregated value of the same attribute related to the first geographical region; and determining the anonymized metric value based on the value of the attribute related to the first geographical location and the aggregated value of the same attribute related to the first geographical region.

6. The method of claim 5, further comprising:

sending, by the first network node device, to a fourth network node device over the network, an indication that includes a request for the aggregated value of the same attribute related to the first geographical region; and receiving, by the first network node device, from the fourth network node device over the network, an indication that includes the aggregated value of the same attribute related to the first geographical region.

7. The method of claim 1, further comprising:

anonymizing a data record identifier of the corresponding data record to obtain an anonymized data record identifier, with the anonymized data record having the anonymized data record identifier.

8. The method of claim 1, further comprising:

generating the anonymized data record based on the anonymized information and the corresponding data record.

9. The method of claim 1, wherein the personally identifiable information includes an address of a residential home, and the certain geographical location corresponds to a mailing address associated with the residential home.

10. The method of claim 1, wherein the first and second network node devices are the same network node device.

11. A first network node device, comprising:

wherein the first network node device is configured to maintain a plurality of data records, wherein each data record is specific to a certain geographical location and has personally identifiable information including the certain geographical location and an attribute related to the certain geographical location, the first network node device being operationally coupled over a network to a second network node device operable to generate web-compatible content that can be rendered for display by a web-browser; and a processing circuitry and a memory, the memory containing instructions executable by the processing circuitry whereby the processing circuitry is configured to:

send, to the second network node device over the network, an indication that includes an anonymized data record that represents a corresponding data record of the plurality of data records that is specific to a first geographical location, wherein the personally identifiable information of the corresponding data record is represented by anonymized information in the anonymized data record wherein the anonymized data record includes:

a first geographical identifier of a plurality of geographical identifiers that corresponds to a first geographical region of a plurality of geographical regions, each region having a plurality of geographical locations and the first geographical region including the first geographical location; and an anonymized metric value determined based on a comparison between a value of an attribute related to the first geographical location obtained from the corresponding data record and an aggregated value of the same attribute related to the first geographical region, wherein the aggregated value is obtained by aggregating corresponding attribute values from a plurality of data records associated with geographical locations included in the first geographical region; and wherein the second network node device is enabled to generate web-compatible content that represents the anonymized data record, with the content being configured to be rendered for display by a web browser.

12. The device of claim 11, wherein the memory includes further instructions executable by the processing circuitry whereby the processing circuitry is configured to:

obtain the corresponding data record; and anonymize the personally identifiable information of the corresponding data record to obtain the anonymized information.

13. The device of claim 11, wherein the memory includes further instructions executable by the processing circuitry whereby the processing circuitry is configured to: anonymize the first geographical location to obtain the first geographical identifier that represents the first geographical region having the first geographical location.

14. The device of claim 13, wherein the memory includes further instructions executable by the processing circuitry whereby the processing circuitry is configured to:

send, to the third network node device over the network, an indication that includes a request to obtain the first geographical identifier based on the included first geographical location included with the request indication; and receive, from the third network node device over the network, an indication that includes the first geographical identifier having the first geographical location.

15. The device of claim 11, wherein the memory includes further instructions executable by the processing circuitry whereby the processing circuitry is configured to:

obtain the value of the attribute related to the first geographical location based on the corresponding data record;

obtain the aggregated value of the same attribute related to the first geographical region; and determine the anonymized metric value based on the value of the attribute related to the first geographical location and the aggregated value of the same attribute related to the first geographical region.

16. The device of claim 11, wherein the memory includes further instructions executable by the processing circuitry whereby the processing circuitry is configured to:

anonymize a data record identifier of the corresponding data record to obtain an anonymized data record identifier, wherein the anonymized data record includes the anonymized data record identifier.

17. The device of claim 11, wherein the memory includes further instructions executable by the processing circuitry whereby the processing circuitry is configured to:

generate the anonymized data record based on the anonymized information and the corresponding data record.

18. The device of claim 11, wherein the first geographical location is an address of a property.

19. The device of claim 11, wherein the first and second network node devices are the same network node device.

20. A system, comprising:

a first network node device configured to maintain a plurality of data records, wherein each data record is specific to a certain geographical location and has personally identifiable information including the certain geographical location and an attribute related to the certain geographical location;

a second network node device operationally coupled to the first network node device over a network and operable to generate web-compatible content that can be rendered for display by a web browser;

wherein the first network node device is operable to send, to the second network node device over the network, an indication that includes an anonymized data record that represents a corresponding data record of the plurality of data records that is specific to a first geographical location, wherein the personally identifiable information of the corresponding data record is represented by anonymized information in the anonymized data record, wherein the anonymized data record includes:

a first geographical identifier of a plurality of geographical identifiers that corresponds to a first geographical region of a plurality of geographical regions, each region having a plurality of geographical locations and the first geographical region including the first geographical location; and an anonymized metric value determined based on a comparison between a value of an attribute related to the first geographical location obtained from the corresponding data record and an aggregated value of the same attribute related to the first geographical region, wherein the aggregated value is obtained by aggregating corresponding attribute values from a plurality of data records associated with geographical locations included in the first geographical region; and wherein the second network node device is operable to generate the web-compatible content that represents the anonymized data record, with the content being configured to be rendered for display by a web browser.

21. The method of claim 1, wherein the attribute related to the first geographical location includes a real estate property value associated with a residential home located at the first geographical location, and the aggregated value of the same attribute related to the first geographical region represents a median real estate property value calculated from property values associated with a plurality of residential homes located within the first geographical region.

* * * * *